Patented Dec. 5, 1939

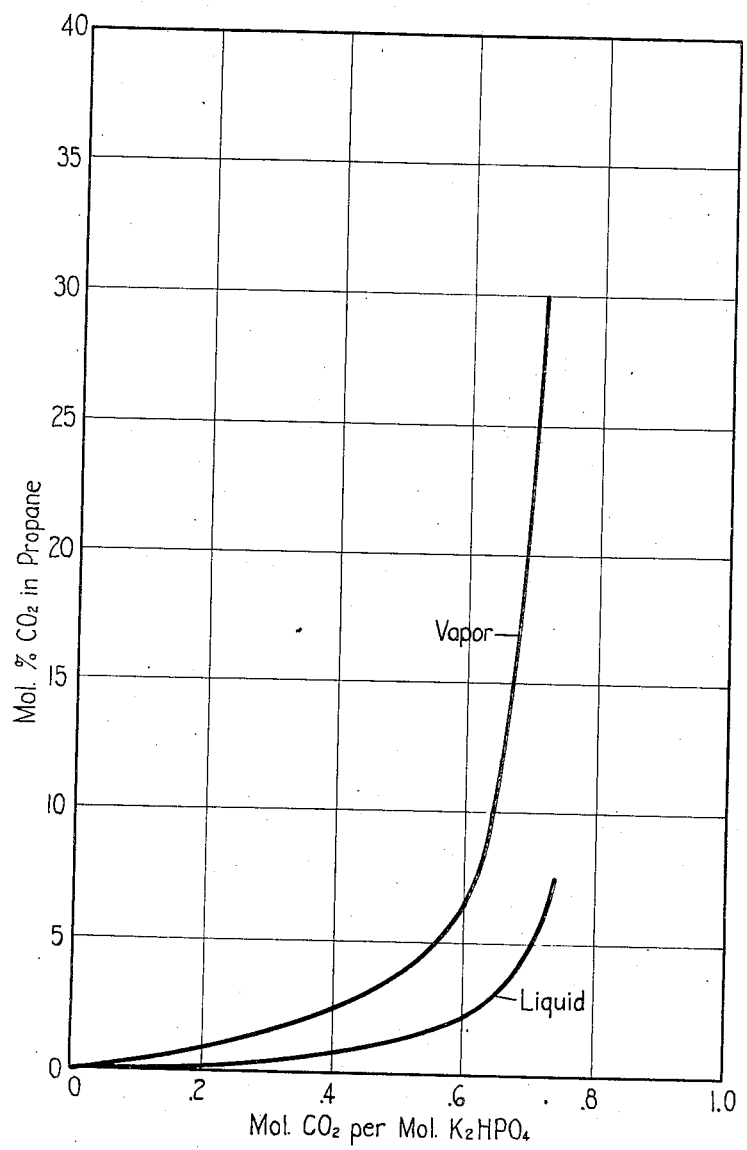

2,182,305

UNITED STATES PATENT OFFICE 2,182,305

RECOVERY OF CARBON DIOXIDE FROM GASEOUS HYDROCARBONS

Ludwig Rosenstein, San Francisco, Calif., assignor to Shell Development Company, San Francisco, Calif., a corporation of Delaware Application January 24, 1938, Serial No. 186,656

3 Claims. (Cl. 23—3)

This invention relates to the separation, by means of an absorbent agent, of volatile acids from hydrophobic liquids, i. e., liquids which are immiscible with water, and especially mineral hydrocarbon oils, which may be either normally gaseous or normally liquid. By the term "volatile acids", I mean those gases which in water solution have an acid reaction, but which are released unchanged upon sufficient heating of the water. Carbon dioxide, hydrogen chloride, sulfur dioxide, mercaptans and hydrogen sulfide are the main gases of this type which are present in the hydrocarbon mixtures commonly encountered in refinery and industrial operations.

The process may be employed for the separation and recovery of these volatile acids from the liquid mixture, or may be employed to purify other liquids by the removal of said acids therefrom.

More specifically, the invention relates to the treatment of industrial liquids which contain volatile acids, particularly hydrogen sulfide, such as products from the destructive distillation of coal, and various petroleum distillates, as, for example, lubricating oils, fuel oils, kerosene, straight run or cracked gasoline, light naphthas, or liquefied normally gaseous hydrocarbons, etc., with an absorbent which permits the recovery of volatile acids, particularly hydrogen sulfide, in a concentrated form, and substantially free from hydrocarbons.

Hydrogen sulfide may be used as initial material for various end-products and it is, therefore, desirable, for my purpose, to obtain hydrogen sulfide as pure as possible. For example, if it is desired to burn hydogen sulfide to sulfur dioxide as in the process for producing sulfuric acid, methods using organic bases or solutions thereof to separate hydrogen sulfide are objectionable when the liquids from which $H_2S$ is separated contain or consist of hydrocarbons. Many of these hydrocarbons are appreciably soluble in such solutions and are sufficiently volatile to be released along with the hydrogen sulfide when the solution is heated. Combustion of the recovered gas can, therefore, lead to combustion products such as carbon monoxide, which are undesirable. Moreover, most of such organic bases are appreciably soluble in the hydrocarbon mixture being treated and necessitate further treatment of the latter to purify the mixture and to recover the bases. The hydrogen sulfide obtained by my process may also be utilized to produce sulfur, as by oxidation in a Claus kiln, or by reacting it with sulfur dioxide produced by combustion of a portion of the hydrogen sulfide.

I have tested the various absorbents commercially utilized and have found them deficient for my purpose in one respect or another. For example, using a solution of sodium sulphide as absorbent, the following reversible reaction takes place:

$$Na_2S + H_2S \rightleftharpoons 2NaHS$$

On boiling the solution after absorption of hydrogen sulphide to substantial completion, the reaction is reversed to the extent of only about 12% and consequently the absorption capacity of the solution on continuous operation was so small as to be impractical. On the other hand, a solution of sodium carbonate absorbs hydrogen sulphide according to the reversible reaction:

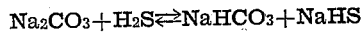
$$Na_2CO_3 + H_2S \rightleftharpoons NaHCO_3 + NaHS$$

On heating the solution saturated with hydrogen sulphide, only a portion of the hydrogen sulphide was released, the other portion remaining in the solution, thus:

$$NaHCO_3 + NaHS \rightleftharpoons Na_2S + H_2O$$

so that sodium sulphide accumulated in the solution until the same condition was established as in the preceding case.

I have discovered that aqueous solutions of $K_3PO_4$, preferably concentrated, are suitable for my purpose as they absorb hydrogen sulphide rapidly and evolve substantially pure hydrogen sulphide on reversing the absorption reaction as by boiling the solution at atmospheric, superatmospheric, or low absolute pressures. The reversal may be carried as far as desirable by continued boiling, and when such boiling is practiced at an elevated temperature, the regenerated solution may be cooled before returning to the absorption step. In case the solution is boiled at a low pressure and corresponding low temperature, cooling of the solution can be dispensed with prior to its return to the absorption step. The regenerated solution may be used in batch, intermittent or continuous processes.

A solution containing both $K_3PO_4$ and $K_2HPO_4$ may be utilized to carry out the absorption of hydrogen sulphide but I prefer to operate with a solution initially containing $K_3PO_4$ only, for while $K_2HPO_4$ in the initial solution results in a higher percentage of the absorbed hydrogen sulphide being evolved for any given time of recovery, it also decreases the capacity of the solution for hydrogen sulphide by limiting the amount of $K_3PO_4$ which can be carried in the solution. I have found that the effective hydrogen sulphide capacity of the solution is greatest for one which initially contains only $K_3PO_4$. Nevertheless, because of the more rapid regeneration, solutions initially containing both $K_3PO_4$ and $K_2HPO_4$ may be found useful, as, for example, in a two stage system in which the liquid is contacted in series.

Working with an aqueous solution of $K_3PO_4$, I have found that during absorption, $K_3PO_4$ is converted to $K_2HPO_4$, as shown by the reversible reaction:

(1) $\qquad K_3PO_4 + H_2S \rightleftharpoons K_2HPO_4 + KHS$ and I have found that this is the reaction which takes place in preference to (2) $\qquad 2K_3PO_4 + H_2S = 2K_2HPO_4 + K_2S$ I have determined the desirable maximum concentration at 25° C. to be 2.57 mol $K_3PO_4$ per 1000 g. aqueous solution. Such a solution is 83% saturated with respect to the potassium content. If a more concentrated solution is used at this temperature, then the less soluble salt ($K_2HPO_4$) will tend to crystallize out in the absorbing unit. Accordingly, the concentration must be adjusted with respect to the $K_2HPO_4$ formed during the absorption and/or added initially so that no substantial crystallization takes place during absorption. At any temperature of operation, a too concentrated solution will deposit crystals. However, if the concentration of the solution is permitted to adjust itself by depositing crystals then the resulting concentration will be the desirable maximum.

I have found, contrary to all expectation, that the sodium phosphates act quite differently from potassium phosphates. First, the maximum usable concentration of sodium phosphates is much less because of their lesser solubilities, and second, the reversal of the absorption reaction is not nearly as rapid or complete. This is probably due to a formation of sodium sulphide in the reverse reaction, thus:

$2Na_2HPO_4 + 4NaHS = 2Na_3PO_4 + Na_2S + 3H_2S$

Consequently, sodium phosphate solutions are not nearly as efficient as potassium phosphate solution, and cannot be considered as equivalents thereof.

The process can be conducted at various temperatures and pressures. The contact between the hydrocarbon mixture and the absorbing liquid may be obtained by passing the two liquids into a mixing device, such as an agitator, permitting the resulting mixture to form two phases, and separating these phases by decantation, centrifuging, or any conventional method known to the art. A series of such mixers and separators may also be employed, and may be used in multiple extraction or countercurrent extraction processes. Alternatively, the two liquids may be caused to flow countercurrently in an extraction column. To liberate the hydrogen sulfide from the absorbing solution a regenerator of the type shown in the U. S. patent to Bottoms, 1,783,901 may be utilized. Water which is vaporized with the hydrogen sulfide may be separated therefrom by a condenser at the top of the regenerator, as disclosed by the patent, thus maintaining the initial concentration of the absorbing agent substantially constant. If desired, water may be introduced from an outside source at suitable intervals or continuously to maintain the predetermined concentration of the absorbent agent if the condensate is not returned to the regenerator. Since the hydrogen sulfide leaving the system is saturated with water, the water thus removed can be compensated for by introduction from an outside source.

Mercaptans and other acidic gases may also be removed from hydrocarbons with the liquid phase potassium phosphate treatment of my invention. Potassium phosphate will scrub out hydrogen sulfide in preference to mercaptans. By limiting the quantity of the potassium phosphate solution to that approximately equivalent to the hydrogen sulfide content it is possible to recover substantially pure hydrogen sulfide. The alkalinity may also be adjusted by using both $K_3PO_4$ and $K_2HPO_4$, so that practically no mercaptans are removed. When desired, such a treatment may be followed by an additional stage to remove the weaker acidic constituents, including mercaptans, and remaining hydrogen sulfide, if any, with a larger quantity of scrubbing solution, and/or one of different alkalinity.

Carbon dioxide may effectively be removed from solutions of liquid hydrocarbons by treatment with $K_3PO_4$ or $K_2HPO_4$ or mixtures thereof. While $K_3PO_4$ is more effective as a scrubbing medium than $K_2HPO_4$, the latter is more easily regenerated and therefore has proven to be the more economical scrubbing agent for $CO_2$. $CO_2$ being a stronger acid than $H_2S$ can be selectively extracted from solutions containing both by using an amount of $K_2HPO_4$ not substantially in excess of that required to remove the $CO_2$. This extraction may then be followed by one in which $K_3PO_4$ is used to remove the $H_2S$. Fractionation of $CO_2$ and $H_2S$ can thus be effected.

I have discovered that the extraction of acid gases such as $H_2S$, $CO_2$, etc., from liquefied normally gaseous hydrocarbons is more efficient than a similar extraction from the same hydrocarbons in the gaseous phase. This difference is illustrated in the attached drawing in which equilibrium curves are plotted for mol per cent $CO_2$ in both liquid and gaseous propane against mol $CO_2$ per mol $K_2HPO_4$ in a scrubbing solution. As will be noted the same amount of $K_2HPO_4$ can remove $CO_2$ from the liquid propane to result in a much lower $CO_2$ content, than from the gaseous propane.

I have found that certain petroleum fractions contain aliphatic acids which are absorbed by the potassium phosphate solution, but cannot be removed therefrom by simple heating. In such situations it is desirable to distill the hydrocarbons and treat only the fraction which does not contain such acids, as, for example, the fraction having a 100° C. end point. These acids may also be removed by subjecting the initial hydrocarbon mixture to a preliminary washing treatment with sodium hydroxide.

There are set forth hereinafter several examples of my invention which it is understood are exemplary only.

*Example I.*—A number of test samples of a liquid hydrocarbon mixture consisting of about 29.9% propylene, 69% propane, and 1.1% $H_2S$ by weight were each separately subjected to single batch extractions in the liquid state at room temperature with different amounts of aqueous solutions containing 2.0, 1.455 and 1.0 grams mols, of $K_3PO_4$ per kilogram, respectively. The weight per cent of $H_2S$ remaining in each treated portion of the hydrocarbon mixture is given in Table I.

Table I

| Sample No. | Grams K₃PO₄ solution per gram of hydrocarbon mixture | Percent by weight H₂S remaining in hydrocarbon mixture | | |
|---|---|---|---|---|
| Gram-mols K₃PO₄ per kilogram of solution | | 2.0 | 1.455 | 1.0 |
| Blank | 0 | 1.1 | 1.1 | 1.1 |
| 1 | 0.125 | .271 | .490 | .638 |
| 2 | 0.200 | .021 | .129 | .419 |
| 3 | 0.250 | .010 | .023 | .251 |
| 4 | 0.500 | .002 | .002 | .006 |
| 5 | 0.750 | | .001 | .002 |
| 6 | 1.000 | | | .001 |

*Example II.*—A number of samples of a similar hydrocarbon mixture, but containing 2.1% H₂S by weight were treated with various amounts of the potassium phosphate solutions as described above in Example I. The results are tabulated in Table II:

Table II

| Sample No. | Grams K₃PO₄ solution per gram of hydrocarbon mixture | Percent by weight H₂S remaining in hydrocarbon mixture | | |
|---|---|---|---|---|
| Gram-mols K₃PO₄ per kilogram of solution | | 2.0 | 1.455 | 1.0 |
| Blank | 0 | 2.1 | 2.1 | 2.1 |
| 1 | 0.125 | 1.274 | 1.482 | 1.668 |
| 2 | 0.200 | 0.775 | 1.120 | 1.415 |
| 3 | 0.250 | 0.430 | 0.875 | 1.242 |
| 4 | 0.500 | 0.007 | 0.0196 | 0.408 |
| 5 | 0.750 | 0.003 | 0.004 | 0.016 |
| 6 | 1.000 | | 0.002 | 0.006 |

*Example III.*—To illustrate the application of the countercurrent method of extraction, a liquid hydrocarbon mixture of the composition described in Example I and an aqueous solution containing 1.455 mols K₃PO₄ per kilogram were continuously introduced into a two stage countercurrent treater in the ratio of 235 grams of solution to 1000 grams of hydrocarbon mixture. The percentage by weight of H₂S remaining in the hydrocarbon is given in Table III:

Table III

| Stage | Percent by weight H₂S in hydrocarbon mixture |
|---|---|
| Inlet | 1.1 |
| Outlet to first plate | 0.047 |
| Outlet to second plate | 0.0016 |

I have found that treating the hydrocarbon in the liquid state results in a substantial improvement over the corresponding treatment in the gaseous or vapor state. The following example demonstrates the superiority of my method over the known vapor phase treatment:

*Example IV.*—Four samples of the hydrocarbon mixture used in Example II (containing 2.1% H₂S) were separately treated in the liquid state in single batch extractions with different quantities of an aqueous solution containing 1.455 mols K₃PO₄ per kilogram, and the per cent H₂S remaining in each treated sample determined. Four other samples of the same hydrocarbon mixture were treated with corresponding amounts of the same potassium phosphate solution, but in the gaseous state. The temperature and pressure were almost the same for the treatments in the gas and in the liquid phases. The per cent by weight H₂S remaining in each treated sample is shown in Table IV:

Table IV

| Sample No. | Grams K₃PO₄ solution per gram of hydrocarbon mixture | Per cent by weight H₂S remaining in hydrocarbon mixture | |
|---|---|---|---|
| | | Liquid phase treatment | Gaseous phase treatment |
| Blank | 0 | 2.10 | 2.10 |
| 1 and 5 | 0.250 | 0.875 | 0.882 |
| 2 and 6 | 0.500 | 0.0196 | 0.0291 |
| 3 and 7 | 0.750 | 0.0039 | 0.0086 |
| 4 and 8 | 1.000 | 0.0023 | 0.0047 |

These data show that scrubbing liquid hydrocarbons produces decidedly better results than scrubbing the gas, especially in the situations in which a high degree of removal of H₂S is desired.

With a view of presenting comparable data to show the effect of varying the treating conditions and concentrations all of the above examples pertain to propylene-propane mixtures. My invention may, however, be applied with success to other hydrocarbons which may be normally gaseous or normally liquid. For example, light petroleum fractions, such as butane, pentane or similar light fractions, petroleum naphtha, gasoline, kerosene, as well as natural gasoline, stabilizer bottoms, refinery recovery hydrocarbon gases and recovering gasoline may be treated in the liquid phase in accordance with the described process.

*Example V.*—A mixture of liquid propane containing 8.7 mol per cent CO₂ was extracted with 150% by weight K₃PO₄ in the form of an aqueous solution containing 1.5 mols K₃PO₄ per kilogram. The CO₂ content of the propane mixture was reduced to .3 mol per cent.

Another mixture of liquid butane containing 9.2 mol per cent CO₂ was extracted with 800% by weight of K₂HPO₄ in the form of an aqueous solution containing 1.5 mols K₂HPO₄ per kilogram. The CO₂ content of the butane mixture was reduced to .6 mol per cent.

It will thus be noted that K₂HPO₄ is less efficient as a scrubbing agent for CO₂ than K₃PO₄, but the ease with which K₂HPO₄ is regenerated by steaming more than compensates for its lesser scrubbing ability. Thus, for instance, a K₃PO₄ solution containing 1.5 mols K₃PO₄ and .734 mol CO₂ per kilogram solution was boiled until its volume was ⅔ of the original volume. The CO₂ content was thereby reduced to .726 mol. On the other hand, a similar solution containing 1.5 mols K₂HPO₄ and .405 mol CO₂ was distilled to ⅔ its original volume and the CO₂ content was thereby reduced to .084 mol per kilogram solution.

While I have in the foregoing described in some detail certain preferred embodiments of my invention and some variants thereof, it will be understood that this is only for the purpose of making the invention more clear, and that the invention is not to be regarded as limited to the details of operation described, nor is it dependent upon the soundness or accuracy of the theories which have been advanced as to the reasons for the advantageous results attained. On the other hand, the invention is to be regarded as limited only by the terms of the accompanying claims, in which it is my intention to claim all novelty inherent therein as broadly as possible in view of the prior art.

This application is a continuation-in-part of my co-pending application Serial No. 25,947, filed June 10, 1935, for Process for treating mineral oil.

I claim as my invention:

1. In the process of recovering $CO_2$ from normally gaseous hydrocarbons of less than 5 carbon atoms by treatment with an aqueous solution of potassium phosphate, the improvement consisting of contacting said hydrocarbons while in the liquid state with the said aqueous solution containing tripotassium phosphate under conditions to maintain both, the material being treated and the treating agent, in the liquid state, thereby producing an aqueous solution containing absorbed $CO_2$, and recovering the $CO_2$ from the latter by steaming.

2. In the process of recovering $CO_2$ from normally gaseous hydrocarbons of less than 5 carbon atoms by treatment with an aqueous solution of potassium phosphate, the improvement consisting of contacting said hydrocarbons while in the liquid state with the said aqueous solution initially containing di- and tri-potassium phosphate under conditions to maintain both, the material being treated and the treating agent, in the liquid state, thereby producing an aqueous solution containing absorbed $CO_2$, and recovering the $CO_2$ from the latter by steaming.

3. In the process of recovering $CO_2$ from normally gaseous hydrocarbons of less than 5 carbon atoms by treatment with an aqueous solution of potassium phosphate, the improvement consisting of contacting said hydrocarbons while in the liquid state with the said aqueous solution under conditions to maintain both, the material being treated and the treating agent, in the liquid state, the potassium phosphate in said solution initially consisting essentially of di-potassium phosphate, thereby producing an aqueous solution containing absorbed $CO_2$, and recovering the $CO_2$ from the latter by steaming.

LUDWIG ROSENSTEIN.